US006162561A

United States Patent [19]

Wang et al.

[11] Patent Number: 6,162,561

[45] Date of Patent: Dec. 19, 2000

[54] AKALINE CELL WITH IMPROVED CATHODE

[75] Inventors: Enoch I. Wang, Mansfield; Francis Wang, Framingham, both of Mass.

[73] Assignee: The Gillette Company, Boston, Mass.

[21] Appl. No.: 09/304,445

[22] Filed: May 3, 1999

[51] Int. Cl.[7] .......... H01M 2/00

[52] U.S. Cl. .......... 429/163; 429/206; 429/224; 429/229; 429/231.8

[58] Field of Search .......... 429/224, 229, 429/206, 231.8, 163

[56] References Cited

U.S. PATENT DOCUMENTS

| | | | |
|---|---|---|---|
| 3,533,740 | 10/1970 | Grund et al. | 423/605 |
| 3,640,683 | 2/1972 | Miyazaki | 423/49 |
| 5,128,222 | 7/1992 | Yoshizawa et al. | 429/190 |
| 5,411,643 | 5/1995 | Cawlfield et al. | 204/115 |
| 5,601,948 | 2/1997 | Binder et al. | 429/344 |
| 5,919,588 | 7/1999 | Jose et al. | 429/224 |

*Primary Examiner*—Laura Weiner
*Attorney, Agent, or Firm*—Barry D. Josephs; Paul I. Douglas; Thomas G. Krivulka

[57] ABSTRACT

A process is described whereby commercial manganese dioxide, for example, electrolytic manganese dioxide (EMD), is treated with ozone before it is utilized as cathode active material in an alkaline cell. The pretreatment of the manganese dioxide is accomplished by contacting manganese dioxide with ozone gas. Alternatively, the manganese dioxide may be treated with ozone while the cathode comprising said manganese dioxide is already in the cell casing. The treatment of the manganese dioxide improves the cell's open circuit voltage (OCV) and results in an increase in service life of the cell, particularly under high power application.

10 Claims, 1 Drawing Sheet

AKALINE CELL WITH IMPROVED CATHODE

FIELD OF THE INVENTION

The invention relates to electrochemical cells having a cathode comprising manganese dioxide. The invention relates particularly to an alkaline cell having an anode comprising zinc, and a cathode comprising manganese dioxide wherein the manganese dioxide has been pretreated with ozone.

BACKGROUND

The cell contents of a primary (non-rechargeable) alkaline cell typically contain an anode comprising zinc, alkaline electrolyte, a cathode comprising manganese dioxide, and an ion permeable separator between the anode and cathode. The alkaline electrolyte is typically an aqueous solution of potassium hydroxide, but other alkali solutions of sodium or lithium hydroxide may also be employed. The cell contents are typically housed in a cylindrical steel container. In the cathodes of conventional $Zn/MnO_2$ alkaline cells the manganese dioxide composition is typically between about 70 and 87 percent by weight. Graphite and aqueous KOH solution (7–11 Normal) can be added to the manganese dioxide to form a cathode mixture. Such mixtures form a moist solid mix which can be fully compacted into the cell casing using plungers or other such compacting devices forming a compacted solid cathode mass in contact with the cell casing. The cathode material can be preformed into the shape of disks which are inserted into the cell in stacked arrangement, for example, as shown in U.S. Pat. No. 5,283,139, and then recompacted.

The anode material can comprise zinc particles admixed with zinc oxide and conventional gelling agents, such as carboxymethylcellulose or acrylic acid copolymers, and electrolyte solution. The gelling agent holds the zinc particles in place and in contact with each other. The ion permeable separator material, typically of cellulosic material or combination of polyvinylalcohol and cellulosic fibers, can be placed over the inside surface of the cathode before insertion of the anode material. A conductive metal nail, known as the anode current collector, is typically inserted into the anode material and is in electrical contact with an end plate which forms the cell's negative terminal.

There is a growing need to make primary alkaline cells better suitable for high power application. Modern electronic devices such as cellular phones, digital cameras and toys, flash units, remote control toys, camcorders and high intensity lamps are examples of such high power applications. Such devices require high current drain rates of between about 0.5 and 2 Amp, typically between about 0.5 and 1.5 Amp. Correspondingly, they require operation at power demands between about 0.5 and 2 Watt.

Manganese dioxide is commonly employed as a cathode active material in commercial batteries including heavy duty cells and alkaline cells, such as zinc/$Mno_2$ alkaline cells comprising an aqueous alkaline electrolyte or lithium/$Mno_2$ cells comprising an organic nonaqueous electrolyte. Conventional alkaline cells have solid cathodes comprising battery grade particulate manganese dioxide. Battery grade manganese dioxide as used herein refers to manganese dioxide generally having a purity of at least about 91 percent by weight. Electrolytic $MnO_2$ (EMD) is the preferred form of manganese dioxide for alkaline cells because of its high density and since it is conveniently obtained at high purity by electrolytic methods. EMD is typically manufactured from direct electrolysis of a bath of manganese sulfate and sulfuric acid. Processes for the manufacture of EMD and its properties appear in Batteries, edited by Karl V. Kordesch, *Marcel Dekker, Inc.,* New York, Vol. 1, (1974), p. 433–488. Battery grade manganese dioxide known as chemical manganese dioxide (CMD), a chemically synthesized manganese dioxide, has also been used as cathode active material in electrochemical cells including alkaline cells and heavy duty cells.

However, manganese dioxide is actually a non stoichiometric material more accurately written as $Mn^{+4}_{1-x-y}Mn^{+3}_{y}V_{x}O_{2-4x-y}(OH)_{4x+y}$, where V stands for vacancy on the cationic site and the OH group indicates the hydroxyl defects present in $MnO_2$. The non-stoichiometry is due to the presence of hydroxyl groups which results in $Mn^{+3}$ defects for the sake of charge neutrality. Because of the $Mn^{+3}$ defects and presence of hydroxyl groups associated therewith, the formula for conventional battery grade manganese dioxide, whether in the from of EMD or CMD, is more accurately represented by the overall formula $MnO_x$, 1.92<x<1.96. (The formula $MnO_x$ as used herein is understood to be an overall representation of the above complex formula.) Thus, if the overall formula is $MnO_{1.92}$ the average valence of manganese is +3.84 (assuming a valence of −2 for oxygen) and if the formula is $MnO_{1.96}$ the average valence of manganese is +3.92. (The term average valence as used herein is intended to be a simple arithmetic average, that is, the sum of the valence of each manganese atom in the manganese dioxide sample divided by the total number of manganese atoms.) Some forms of CMD can be synthesized to have lower average levels of oxidation, for example $MnO_x$, wherein x can be >1.5. More generally manganese dioxide can be synthesized having an overall formula $MnO_x$, wherein 1.5<x<2.0.

U.S. Pat. No. 2,956,860 (Welsh) discloses a chemical process for the manufacture of battery grade $MnO_2$ by employing the reaction mixture of $MnSO_4$ and an alkali metal chlorate, preferably $NaClO_3$. This process is known in the art as the "Sedema process" for manufacture of chemical manganese dioxide (CMD).

It would be desirable to treat conventional battery grade manganese dioxide (EMD or CMD) used as active material in electrochemical cells, particularly alkaline cells to remove the MnOOH defects in the EMD or CMD structure and increase the average valence of manganese to approach more closely absolute +4. This would theoretically improve the specific capacity (milliAmp−Hr/g) of the manganese dioxide in the cell and could make the treated manganese dioxide more suitable for high power application.

SUMMARY OF THE INVENTION

It has been determined that if conventional manganese dioxide powder, for example, electrolytic manganese dioxide (EMD) or chemical manganese dioxide (CMD) is treated with ozone ($O_3$), the average valence of the manganese in the manganese dioxide powder can be increased resulting in improved performance of electrochemical cells, particularly alkaline cells, employing the treated manganese dioxide as cathode active material. Such treatment of the manganese dioxide with ozone results in an increase in service life of the cell, particularly under high power application and also improves the cell's open circuit voltage (OCV).

In an aspect of the invention the average valence of manganese in the manganese dioxide, for example EMD or CMD, can be increased from a value of between about +3.84 ($MnO_{1.92}$) and +3.92 ($MnO_{1.96}$) to a valence between about +3.92 and +4.00 by treatment of the manganese dioxide with ozone. In general, the average valence of manganese in manganese dioxide powder having an overall formula $MnO_x$, 1.5<x<2.0 can be increased by treating the manganese dioxide with ozone. The average valence of the manganese in said manganese powder can be increased to a value approaching absolute +4.00 by treatment of said manganese dioxide powder with ozone. The treated manganese dioxide can be advantageously used as cathode active material in electrochemical cells, particularly zinc/$MnO_2$ alkaline cells.

In a specific aspect of the invention electrolytic manganese dioxide (EMD) having an overall formula $MnO_y$, wherein y <2.0, can be reacted with ozone to produce a manganese dioxide product, $MnO_z$, wherein y<z<2.0 and said manganese dioxide product can be advantageously used as cathode active material in an electrochemical cell, particularly a zinc/$MnO_2$ alkaline cell.

In an aspect of the invention manganese dioxide powder, e.g. EMD or CMD powder, can be placed in a conduit or porous vessel and ozone gas passed through the manganese dioxide powder thereby oxidizing the powder and increasing the average valence of the manganese therein, preferably to a value between about +3.92 and +4.000, more preferably to a value of +4.000. The reaction is exothermic. The reaction heat may be dissipated by optionally cooling the reaction conduit or vessel with a jacket of circulating cold water or other coolant, or else the conduit or vessel may be cooled with cool air or other gaseous cooing medium so that the reaction temperature does not exceed about 50° C. and preferably remains at about room temperature, e.g. between about 10° C. and 30° C. The process of the invention is not intended to be limited to treatment of particulate manganese dioxide with ozone, since $MnO_2$ in the form of large aggregates or lumps of material, e.g. aggregates or lumps of EMD of CMD, may also be treated with ozone to increase the valence of the manganese therein. However, it is desirable to treat the $MnO_2$ with ozone when the $MnO_2$ is in particulate form, preferably having an average particle size in a range between about 1 and 500 micron ($1\times10^{-6}$ and $500\times10^{-6}$ meter), preferably between about 5 and 200 micron ($5\times10^{-6}$ and $200\times10^{-6}$ meter).

The ozone gas contacting the manganese dioxide powder is desirably between about 1 atm and 1.5 atm , preferably slightly above 1 atmosphere. Alternatively, a partial vacuum may be applied to the $MnO_2$ power prior to the introduction of ozone. The partial vacuum is less than 1 atmosphere and preferably between about $1\times10^{-3}1\times10^{-2}$ atmosphere. Subjecting the $MnO_2$ powder to a vacuum removes residual trapped air inside the pores of $MnO_2$, thus enhancing the gas-solid reaction between ozone and $MnO_2$.

The ozone at the point of contact with the manganese dioxide may desirably be at a temperature of between about 5° C. and 80° C., preferably at about room temperature of between about 10° C. and 30° C., for example, at about 25° C. The manganese dioxide can be preheated to a temperature of between about 200 and 450° C. before contact with ozone. However, such preheating is not required. It is preferred that the reaction of manganese dioxide and ozone be maintained at about room temperature, e.g., between about 10 and 30° C., since the reaction kinetics are sufficiently high at such temperature to effect the oxidation of manganese in the manganese dioxide to an average valence between about +3.92 and +4.000, more preferably to an average valence of about +4.000. This is equivalent to result in the oxidation of said manganese dioxide to $MnO_y$. wherein 1.96<y<2.000. The ozonation of particulate manganese dioxide such as battery grade EMD or CMD, is desirably carried out for a period from between about 0.01 and 4 hours, until the desired degree of oxidation of manganese is achieved. There is no need to add catalyst to increase the reaction kinetics, but it should be understood that catalyst can be added.

It has determined that the reaction of conventional battery grade manganese dioxide (EMD or CMD) with ozone increases the open circuit voltage (OCV) of the fresh cell, that is, increases the cell's electromotive force (EMF). Such increase in OCV is not easily predictable and generally requires experimental testing for confirmation. The increase in average valence of manganese achieved by the ozonation of EMD or CMD also increases the theoretical and actual specific capacity (milliAmp–hr/g) of the manganese dioxide when employed as cathode active material in electrochemical cells, particularly alkaline cells. The resultant effect is that alkaline cells comprising manganese dioxide cathode active material pretreated with ozone are better suited for high power application (e.g. at about 0.5 and 2 Watt or between about 0.5 and 2 Amp drain) and in fact exhibit better performance under such high power or high current drain conditions.

The invention has particular applicability to the ozonation of manganese oxide for use as cathode active material in electrochemical cells, particularly alkaline cells. Such alkaline cells typically employ zinc anode (Zn/$MnO_2$ alkaline cell) or lithium anode (lithium/$MnO_2$ alkaline cell) and alkaline electrolyte, preferably aqueous potassium hydroxide. However, the ozonated manganese dioxide of the invention can be used advantageously in other cells which can utilize manganese dioxide as cathode active material, for example, heavy duty cells.

The cells to which the ozone treated manganese dioxide are applied as cathode active material are not intended to be restricted to any particular anode composition, or any particular mixture of components for the cathode comprising the manganese dioxide or to any particular separator, cell size, cell construction or cell treatment. Thus, the ozone treated manganese dioxide, e.g. ozone treated EMD or CMD, can be used as cathode active material in conventional zinc/$Mno_2$ alkaline cells containing "zero amounts" of added mercury. Zero-added mercury cells contain no added amounts of mercury, but may contain only the residual amount of mercury present in commercially available pure zinc, including the residual amount of mercury, if any, present in the other cell components. The total mercury content in such cells is less than 50 parts mercury per million parts total cell weight, typically less than 10 parts mercury per million parts total cell weight.

The above stated improvements in service life and open circuit voltage (OCV) can generally be attained by either pretreating particulate manganese dioxide with ozone before the cathode mixture, typically comprising manganese dioxide, graphite and aqueous potassium hydroxide, is formed, or else treating the cathode mixture with ozone after the cathode mixture is actually formed or after the cathode mixture is inserted into the cell.

DETAILED DESCRIPTION

Figure 1:
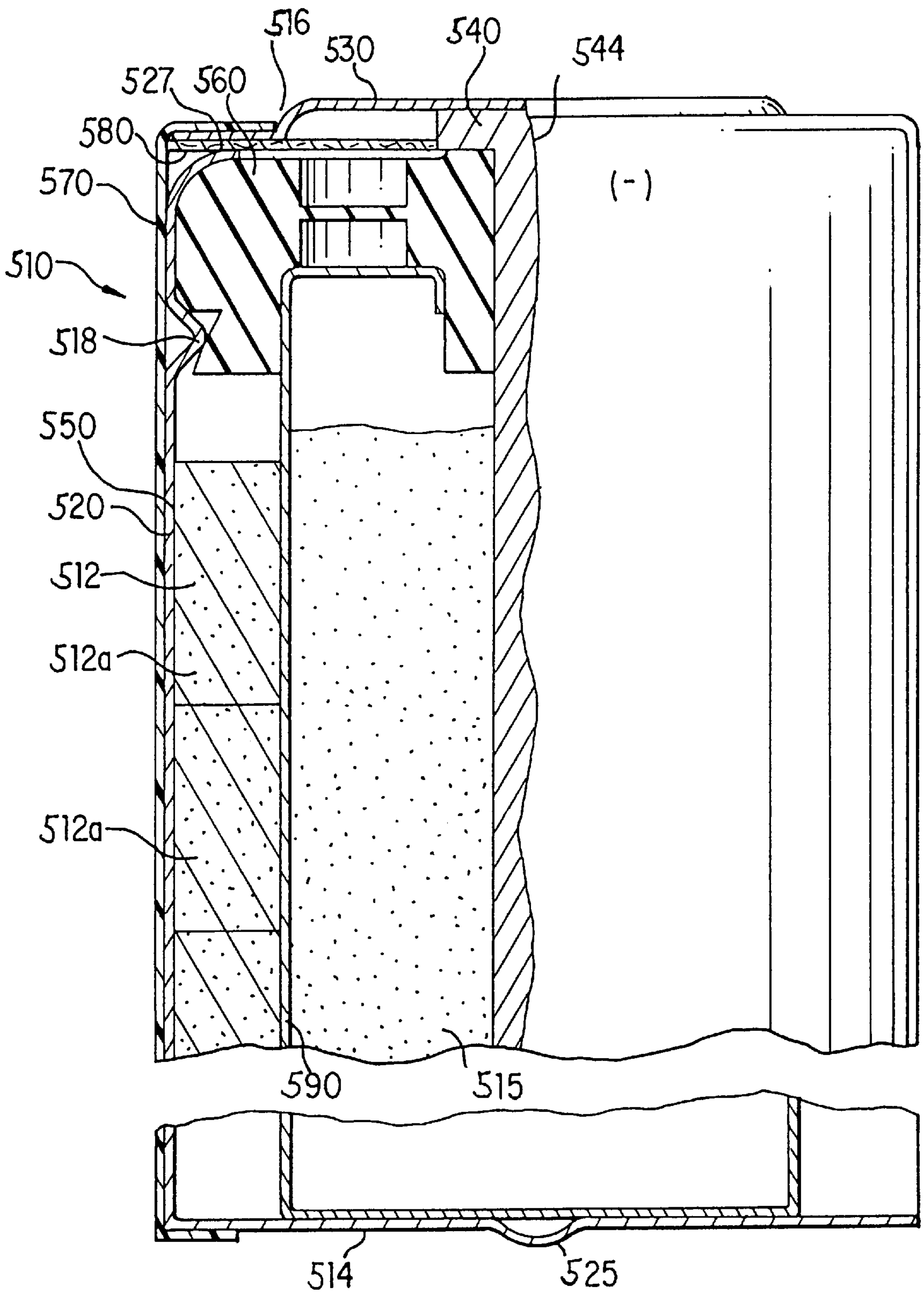
FIG. 1 is a cross-sectional cut away view of an alkaline cell having a cathode comprising manganese dioxide treated by the process of the invention.

A representative primary zinc/manganese dioxide alkaline AA cell can be prepared with particulate manganese dioxide pretreated with ozone by the process of the invention. The AA cell is prepared with a cell casing formed of steel which is plated on the inside and outside surface with nickel. Conventional cathode and anode mixtures, electrolyte and separator membrane are employed, except that the particulate manganese dioxide employed in the cathode is pretreated with ozone in accordance with the invention. The anode material ca be in the form of a gelled mixture containing mercury free (zero-added mercury) zinc alloy powder. Such mixture may typically contain aqueous KOH electrolyte solution, gelling agent, e.g. acrylic acid copolymer such as CARBOPOL C940 from B.F. Goodrich; and surfactants e.g. organic phosphate ester surfactant GAFAC RA600 from Rhone Poulenc. Specific formulations of representative zinc slurries are disclosed in European Patent Publication 0474382A1. The separator membrane can be a conventional ion permeable membrane of nonwoven material comprising polyvinylalcohol and cellulosic fibrous material. The electrolyte is an aqueous solution of KOH containing about 40 wt % KOH and 2 wt % ZnO, hereinafter referred to as "aqueous KOH solution".

The cathode in the cell has the following composition:

Electrolytic manganese dioxide (80–87 wt %), graphite (7–10 wt %), and a 7–11 Normal "aqueous KOH solution" (5–7 wt %).

A representative alkaline cell configuration is shown in FIG. 1. The alkaline cell 510 comprises a cylindrical steel casing 520, having a closed end 514 and an open end 516. The cell is filled with cathode 512 comprising $MnO_2$, and an anode 515 comprising zinc and electrolyte. The electrolyte comprises a conventional mixture of KOH, ZnO and gelling agent. The cathode 512 can be supplied in the form of a series of compacted annular blocks 512*a*. The anode and cathode can be separated by a conventional ion porous separator 590, for example, comprising polyvinylalcohol and cellulosic fibrous material. After cell 510 is filled an insulating plug 560 is inserted into open end 516. The plug 560 is preferably snap fitted around circumferential step 518 as shown in FIG. 1 so that the plug locks in place into the open end 516. The peripheral edge 527 of casing 520 is crimped over the top of insulating plug 560. A paper insulating washer 580 is applied over the crimped peripheral edge 527 of casing 520. Insulating washer 80 can be a polyethylene coated paper washer. A terminal end cap 530 is welded to the head of current collector 540. The elongated current collector 540 is then inserted (force fitted) into aperture 544 of insulating plug 560 so that end cap 530 comes to rest against insulating washer 580. Conventional asphalt sealant may be preapplied around the current collector 540 before it is inserted into aperture 544. A film label 570 is applied around casing 520. The terminal end cap 530 becomes the negative terminal of alkaline cell 510 and pip 525 at the closed end of casing 520 becomes the positive terminal.

The cell 510 shown in FIG. 1 can be an AA cell. However, the alkaline cell shown in FIG. 1 is not intended to be restricted to any particular size. Additives may be employed, as conventional, to modify the cell chemistry. Alkaline cell 510 is not intended to be restricted to any particular cell chemistry or cell size. Thus cell 510 may contain conventional alkaline cell chemistries including those which contain zero added mercury (less than 50 parts mercury per million parts total cell weight, preferably less than 10 parts mercury per million parts total cell weight) and modifications thereof. Such representative chemistries, for example, is disclosed in U.S. Pat. No. 5,401,590, herein incorporated by reference. Also, although the invention is principally directed to primary alkaline cells the anode and cathode chemistries can be adjusted so that the cells become secondary (rechargeable) cells.

The above cell (FIG. 1) can be prepared and used as test cells. The manganese dioxide powder used as cathode active material for cathode mixture 512 can be pretreated with ozone as described in the following examples:

EXAMPLE 1

(Ozonation of EMD powder)

700 grams of EMD powder ($MnO_{1.96}$) was placed inside a modified Erlenmeyer flask. The Erlenmeyer flask was modified by a glass blower, with internal flaps that help to disperse the powder. The flask was clamped to a holder which in turn was attached to a motor for rotating the flask. The flask was placed inside a fumed hood. Ozone was generated by an ozone generator (Model GTC-0.5 from Griffin Technics Inc.). About 20 g/hr of ozone was produced with oxygen as the feed gas. Oxygen flow rate was adjusted at 7 liters per minute at 12 psi and 120V. The ozone was passed over the EMD powder while rotating the flask which was kept within the fumed hood. Since the ozonation reaction is an exothermic reaction, the flask was rotated inside a water-cooling bath maintained at room temperature (25° C.). The ozonation time was about 20 minutes. After ozonation, the powder was removed from the flask and stored in a Nalgene bottle.

The ozonated EMD powder was analyzed and its manganese (Mn) oxidation state (valence) increased from 3.92 (MnO1.96) to 3.98 after ozonation, thus yielding an ozonated EMD powder having the formula $MnO_{1.99}$. The ozonated EMD was then mixed with graphite and 7–11 Normal KOH solution to form a mixture comprising 85.8 wt. % ozonated EMD, 7.27 wt. % graphite, and 6.93 wt. % of KOH solution. The cathode mixture was then pressed into pellets and used in the alkaline AA cell above described having the above describe conventional components except for the ozonated EMD. A like comparison cell of same composition was made except that the manganese dioxide powder (EMD) was not subjected to ozonation.

The cells were conditioned for 2 weeks in an oven prior to testing. Several performance tests were conducted. cells were discharged at 1 Watt continuous discharge to 1.0 Volt cutoff and 0.9 Volt cut-off. cells were discharged intermittently at 1.1 Amp at 10 seconds per minute for 1 hour per day to a cut-off voltage of 1.0 Volt and then to a cut-off voltage of 0.9 Volts. The performance results are tabulated below in Table 1. The cells with the ozonated EMD powder in the cathode mixture showed significant improvement in load voltage and resulted in longer service life in all of the performance tests.

TABLE 1

| Performance Test | AA Cell With Untreated EMD Service Hours (Comparison Cell) | AA Cell With Ozonated EMD Service Hours | Percent Improvement In Service Hours |
|---|---|---|---|
| 1 Watt continuous to 1.0 V cut-off | 0.602 | 0.668 | 11% |
| 1 Watt continuous to 0.9 V cut-off | 0.763 | 0.801 | 5% |
| 1.1 Amp discharge at 10 sec. per min. for 1 hour per day to 1.0 V | 0.455 | 0.569 | 25% |

TABLE 1-continued

| Performance Test | AA Cell With Untreated EMD Service Hours (Comparison Cell) | AA Cell With Ozonated EMD Service Hours | Percent Improvement In Service Hours |
|---|---|---|---|
| 1.1 Amp discharge at 10 sec per min. for 1 hour per day to 0.9 V | 0.716 | 0.831 | 16% |

EXAMPLE 2

(Ozonation of Compacted EDM Cathode While Inside the Cell Casing).

A conventional alkaline cell cathode mixture comprising EMD, graphite and 7–11 Normal KOH solution comprising 85.8 wt. % EMD, 7.27 wt. % graphite, and 6.93 wt. % of the KOH solution was formed and compacted into a cell casing. Ozone gas was generated by an ozone generator (Model GTC-0.5 from Giffin Technics Inc.). About 20 g/hr of ozone was generated with oxygen as the feed gas. The oxygen feed gas was supplied to the generator at a constant flow rate of 7 liters per minute as 12 psi and the generator was set to 120 Volts. The ozone produced was blown into the compacted solid cathode which had been inserted into the cell casing. This was done under a fumed hood for an ozonation time of about 20 minutes. The cathode material felt warm during this period indicating that the exothermic reaction for ozonation of EMD in the cathode was occurring. After ozonation of the EMD in the cathode was completed, a conventional separator material was inserted over the cathode and the anode zinc slurry supplied to the cell in conventional manner. A like comparison cell of same composition was made except that the manganese dioxide in the cathode was not subjected to ozonation. The cells were sealed in conventional manner. The cells were conditioned for 2 weeks in an oven prior to testing for high rate performance. The cells were discharged at 1 Watt continuous discharge to 1.0 Volt cut-off and to 0.9 Volt cut-off. Cells with the ozonated cathode showed significant improvement in load voltage and resulted in longer service life as shown in Table 2.

TABLE 2

| Performance Test | AA Cell With Untreated EMD Service Hours | AA Cell With Ozonated EMD Service Hours | Percent Improvement In Service Hours |
|---|---|---|---|
| 1 Watt continuous to 1.0 V cut-off | 0.483 | 0.615 | 27% |
| 1 Watt continuous to 0.9 V cut-off | 0.758 | 0.825 | 9% |

EXAMPLE 3

20 grams of EMD powder ($MnO_{1.96}$) was placed inside a modified Erlenmeyer flask. The Erlenmeyer flask was modified by a glass blower, with internal flaps that help to disperse the powder. The flask was clamped to a holder which in turn was attached to a motor for rotating the flask. The flask was placed inside a fumed hood. Ozone was generated by an ozone generator (Model GTC-0.5 from Griffin Technics Inc.). About 20 g/hr of ozone was produced with oxygen as the feed gas. Oxygen flow rate was adjusted at 7 liters per minute at 12 psi and 120 Volts. The ozone was passed over the EMD powder while rotating the flask which was kept within the fumed hood. Since the ozonation reaction is an exothermic reaction, the flask was rotated inside a water-cooling bath maintained at room temperature (25° C.). Individual runs were made with identical EMD samples but with the ozonation time varied from about 5 minutes to 2.5 hours. After ozonation, the powder was removed from the flask and stored in a Nalgene bottle.

A conventional alkaline cell cathode mixture comprising the ozonated EMD, graphite and 9–11 Normal KOH solution comprising 85.8 wt. % ozonated EMD, 7.27 wt. % graphite, and 6.93 wt. % of the KOH solution was formed and compacted into a AA cell casing. A conventional separator material was inserted over the cathode and the anode zinc slurry supplied to the cell in conventional manner. The cell was sealed in conventional manner and tested for its open circuit voltage. Like AA comparison cells were prepared in the same manner using same cathode composition, except that the EMD used in the cathode had not been treated with ozone. The open circuit voltage (OCV) was determined for the fresh comparison cell and for each fresh cell containing the EMD treated for various periods with ozone. The OCV of the cells with the ozone treated EMD showed a significant increase over the OCV of the untreated comparison cell. The fresh cell OCV values are reported in Table 3.

TABLE 3

| Ozonation Time of EMD, Hours | OCV of Fresh AA Alkaline Cells with Ozonated EMD, Volts |
|---|---|
| Comparison Cell (no ozonation) | 1.617 |
| 0.08 | 1.800 |
| 0.17 | 1.841 |
| 1.5 | 1.864 |
| 4 | 1.889 |

The valence x of manganese achieved with the ozonation of commercial manganese dioxide, for example, ozonation of EMD or CMD at room temperature (25° C.) can be readily controlled to result in a value $3.92 \leqq x \leqq 4.000$. This produces a treated manganese dioxide of overall formula $MnO_y$. wherein $1.96 \leqq y \leqq 2.000$.

Alternatively, it has been determined possible to remove a portion of the MnOOH defects by heating commercial manganese dioxide, for example, battery grade EMD or CMD to temperatures beyond 250° C. However, the EMD or CMD tends to lose oxygen at elevated temperatures, resulting again in less than full oxygen stoichiometry. Although heating alone may improve the EMD or CMD structure by reducing the MnOOH defects it does not lead to essentially full oxidation and average valence of manganese approaching +4.00 as does the ozonation process described herein.

Alternatively, oxidation of commercial EMD or CMD can be achieved by treating the EMD or CMD with oxidants such as persulfate or chlorate in solution. However, such treatment generates excessive chemical impurities which must be separately removed, thereby complicating the process. Also in the oxidation reaction of EMD or CMD with chemical oxidants such perchlorate or chlorate is difficult to control and may result in overoxidation, which in turn can result in degrading cell performance.

By contrast the preferred embodiment of the oxidation process of the invention utilizing ozone gas as the oxidant involves a solid-gas reaction which is easier to control, for example, by simply adjusting the ozonation time. The ozonation process of the invention produces a full oxidation of EMD or CMD without generating chemical waste impurities which must be separately removed from the treated EMD or CMD.

Although the present invention was described with respect to specific embodiments, it should be recognized that variations are possible without departing from the concept of the invention. Thus, the invention is not intended to be limited to the specific embodiments, but rather its scope is reflected by the claims and equivalents thereof.

What is claimed is:

1. An electrochemical cell comprising a casing, a positive and a negative terminal, an anode, a cathode comprising manganese dioxide, and electrolyte, wherein said cathode is made by a method comprising the steps of treating electrolytic manganese dioxide (EMD) by contacting said electrolytic manganese dioxide with ozone gas.

2. The electrochemical cell of claim 1 wherein the anode comprises zinc and said electrolyte comprises an aqueous solution of potassium hydroxide.

3. The electrochemical cell of claim 2 wherein said cell exhibits increased fresh cell open circuit voltage (OCV) and increased discharge service life.

4. The process of claim 1 wherein said ozone is passed in contact with the manganese dioxide for a period from between about 0.01 and 4.0 hours.

5. An alkaline electrochemical cell comprising a cylindrical metal casing, a positive and a negative terminal, an anode, a cathode comprising manganese dioxide, and an aqueous alkaline electrolyte, wherein said cathode is made by the steps comprising forming a cathode mixture of particulate manganese dioxide, graphite, and aqueous alkaline electrolyte; inserting said mixture into said metal casing and passing ozone in contact with said mixture in said casing.

6. The alkaline cell of claim 5 wherein the anode comprises zinc.

7. The alkaline cell of claim 6 wherein the aqueous electrolyte comprises potassium hydroxide.

8. The alkaline cell of claim 7 wherein said cell exhibits increased fresh cell open circuit voltage (OCV) and increased discharge service life.

9. The alkaline cell of claim 5 wherein said ozone is passed in contact with said cathode mixture for a period from between about 0.01 and 4.0 hours.

10. An electrochemical cell comprising a casing, a positive and a negative terminal, an anode, a cathode comprising manganese dioxide, and electrolyte, wherein said manganese dioxide is made by a method comprising the steps of forming electrolytic manganese dioxide and subsequently treating said electrolytic manganese dioxide (EMD) by contacting said electrolytic manganese dioxide with ozone gas.

* * * * *